United States Patent

[11] 3,609,539

| [72] | Inventor | Richard J. Gunthert |
| | | Wappingers Falls, N.Y. |
| [21] | Appl. No. | 755,868 |
| [22] | Filed | Sept. 28, 1968 |
| [45] | Patented | Sept. 28, 1971 |
| [73] | Assignee | International Business Machines Corp. |
| | | Armonk, N.Y. |

[54] SELF-ALIGNING KELVIN PROBE
3 Claims, 5 Drawing Figs.

[52] U.S. Cl. .................................................... 324/72.5, 324/158
[51] Int. Cl. ............................................... G01r 31/02
[50] Field of Search ........................................ 324/158 F, 72.5, 149

[56] References Cited
UNITED STATES PATENTS

| 1,718,529 | 6/1929 | Coldwell | 324/158 UX |
| 2,858,515 | 10/1958 | Thunander | 324/158 UX |
| 3,107,963 | 10/1963 | Hansen | 324/158 UX |
| 3,234,496 | 2/1966 | Cedrone | 324/158 X |
| 3,405,361 | 10/1968 | Kattner | 324/158 |
| 3,340,473 | 9/1967 | Hertzler, Jr. | 324/158 F |
| 3,453,545 | 7/1969 | Oates | 324/158 F |

OTHER REFERENCES

Croisier et al., Tester for Semiconductor Devices, IBM Tech. Discl. Bull.; Vol. 7, No. 6, Nov. 1964, pp. 444– 445 (Copy in 324-158)

Mozer, D.; Flexible Kelvin Contactor; IBM Tech. Disc. Bull.; Vol. 10; No. 8, Jan. 1968, (Copy in 324-158 F) pp. 1266

Primary Examiner—Rudolph V. Rolinec
Assistant Examiner—R. J. Corcoran
Attorneys—Hanifin and Clark and Maurice H. Klitzman ABSTRACT: Electrical contact device for Kelvin probing comprising two contact bars separated by an insulator, said bars having self-aligning shaped contact ends for self-aligning upon a protruding electrical contact on the body to be probed.

INVENTOR
RICHARD J. GUNTHERT
BY Maurice H. Klitzman
ATTORNEY

SELF-ALIGNING KELVIN PROBE

FIELD OF THE INVENTION

Electrical contact structures comprising electrically conductive probing members such as fingers, needles, or clamps, that make electrical contact with the item to be probed.

BACKGROUND OF THE INVENTION

Kelvin probing is the technique which permits the application of power to two or more electrical terminals through one set of leads and permits the sensing of the voltage potential between these two terminals with a high impedance measuring system via another set of leads to the same two terminals thus minimizing the effects of the resistance of the points of contact. For example, in a simple case there may be two electrical contacts upon a semiconductor device. To test the properties of the device, the voltage potential could be measured with a known current supply, or the current may be adjusted until a desired voltage is obtained. The electrical properties of the device are related to the voltage or current, as the test may be. In Kelvin probing, a first lead is brought into contact with the first contact on such a device, and a second lead is brought into contact with the second contact on such device. These two contacts are externally connected to a testing means, the circuit being completed by the device itself. These two leads may carry a constant current source. Another lead is then brought into contact with the first contact on said device, and a final lead is brought into contact with the second contact of said device. The contacts may, of course, be made in any desired order or simultaneously. These two leads would be attached to a high impedance measuring system. Thus the test measurements upon the device may be conducted in a more accurate manner than may be done with, for example, two single point contacts.

Thus, each contact or contact area upon the device to be tested must have two electrical leads brought to it. Such contact areas, generally being fragile, result in connection problems. It is, of course, necessary that lead connection to such contacts actually be made, and be made in a manner that will indicate true results. Cracking or breaking of such contact areas will destroy the device as well as give erroneous readings therefrom. Where the contact on the semiconductor device is a protruding contact, slippage of the lead to the contact is likely, resulting in erroneous readings. In any event, sufficient force must be applied between the test lead and the contact to assure good electrical contact, without damaging the device. This precludes, of course, the use of solder or other permanent type contact means. Pressure contact is the only feasible means. The alignment of individual probes, such as fine needles, to a small contact area as is typical upon semiconductor devices, i.e., 4 mil solder balls, is exceedingly difficult and time consuming. Uneven pressures applied to each needle can crack or seriously damage the device. The alignment time is great, and the results often suspect.

Thus, it is an object of this invention to assure equal pressure contact of test leads upon a given contact of a semiconductor device for Kelvin measurements.

Another object of this invention is to combine in a single probe two electrical leads for Kelvin probing.

A further object of this invention is to shape the tips of the electrical contact leads on the Kelvin probe so as to be self-aligning on a protruding electrical contact.

SUMMARY OF THE INVENTION

These and other objects are met by the electrical probe of this invention. Briefly, this probe comprises two electrically conductive bars separated by an insulating layer. One end of each bar is electrically connectable to external electrical test equipment, the other end of each bar is of a semitrough shape. The bar tips thus jointly form a trough shape to contact a protruding electrical contact on the body to be probed. The semitrough shape is designed to be slidable upon the area to be contacted, and thus self-aligning, when the force applied when one of the bars at its semitrough shape end contacts a protruding contact surface is sufficient to overcome the retarding frictional effect of such contact. This self-aligning feature allows reliable electrical contact between a probe and a protruding contact, thus alleviating some tolerance problems, and significantly reducing the possibility of damage to the contacted body. These and other aspects of the invention will be understood when viewed in relation to the general description and drawings.

IN THE DRAWINGS

GENERAL DESCRIPTION

Figure 1:
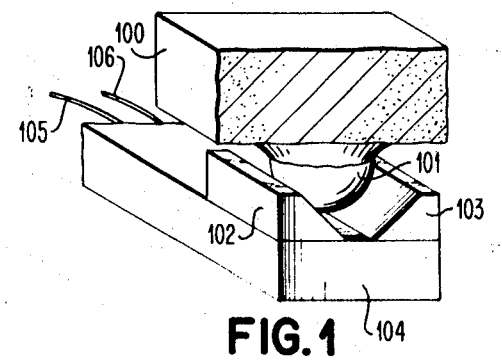
FIG. 1 shows an electrical contact device of this invention in contact with a spherical protruding electrical contact.

Kelvin probing, which is well known in the art, is a measurement technique commonly used for the testing of the properties of semiconductor devices. FIG. 1 shows a portion of a semiconductor device 100 having a raised or protruding electrical contact 101 thereon. This raised contact 101 may typically be a deposited mound of solder, contacting an emitter, base, or collector region of the device 100. Shown contacting the protruding electrical contact 101 is one embodiment of the electrical contact device for Kelvin probing. This comprises electrically conductive members 102 and 103 mounted on an insulating member 104. Electrically conductive members 102 and 103 are electrically isolated from each other, as shown. Internal wiring 105, 106, runs through insulator member 104 and connects with electrically conductive members 102 and 103, respectively. Members 102 and 103 are shown at a certain V-angle. This angle is important, and will be discussed later.

Figure 2:
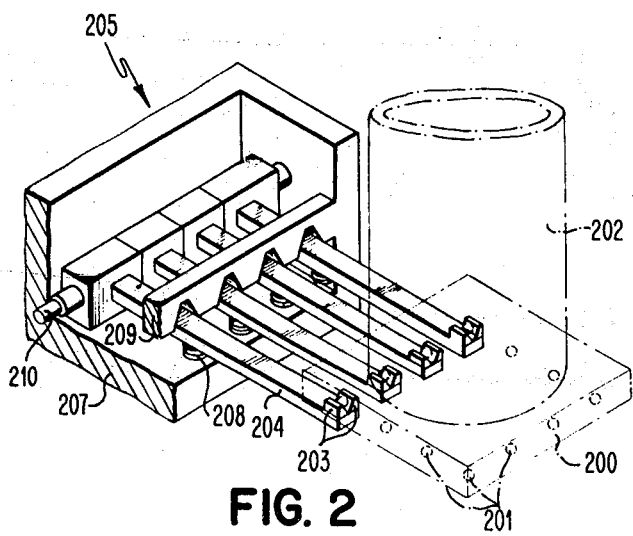
FIG. 2 shows the electrical contact devices of FIG. 1 on a series of aligning bars, contacting a multitude of protruding spherical contacts on a semiconductor device.

FIG. 2 shows the electrical contact device of FIG. 1 in relation to its alignment fixture and a complete semiconductor device. Semiconductor device 200 having protruding electrical contacts 201, such as the raised solder balls mentioned previously, is held in a test position by a holding member 202. The electrical contact devices 203 attached to insulating member 204, which also serves as a beam member, is shown as part of an alignment unit 205. Alignment unit 205 comprises a frame 207, springs 208, position bar 209, and bearing assembly 210. Each insulating member 204 is mounted into the bearing assembly 210 independently of each other insulating member. Each insulating member given two degrees of freedom when released from the aligning bar, movement in the X and Y planes. Z plane movement is a constrained movement due to the rotational movement of the insulating body, providing a desirable, but not essential, contact wiping action. The freedom which this technique provides is similar to that provided by supporting a long arm on a shaft by use of a ball bearing assembly. Position bar 209 functions to keep insulating members 204 in an initial alignment position which corresponds approximately to the position of protruding electrical contacts 201 to be tested on semiconductor device 200.

When holding member 202 brings the semiconductor device 200 having the protruding electrical contacts 201 down into position to contact the electrical contact devices 203, the insulating members 204 will be freed from the position bar 209, and will, because of the special angle chosen on each electrical member 203, allow self-aligning of each Kelvin probe on the protruding electrical contacts 201.

This self-aligning feature is of critical importance. The insulating members 204, being delicately balanced, require but the slightest exertion on the electrical contact devices 203 by the semiconductor device 200 acting through the protruding electrical contacts 201 to allow the angled electrical contact device 203 to self-align. This minimal force required, coupled with the self-aligning feature, allows minimum force to be exerted on the delicate protruding electrical contacts 201.

The self-aligning feature further assures that both electrical members of the electrical contact device will contact the protruding electrical contacts uniformly, with assurance that such contact is being made. Various testing cycles can, thus, be achieved by using the standard Kelvin probing measurement techniques.

Figure 4:
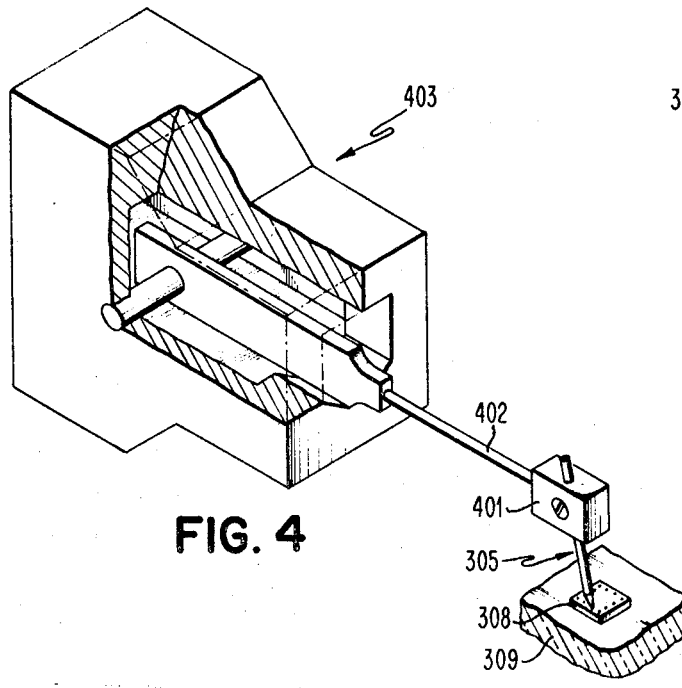
FIG. 4 shows the electrical contact device of FIG. 3 coupled to an alignment assembly.
Figure 3:
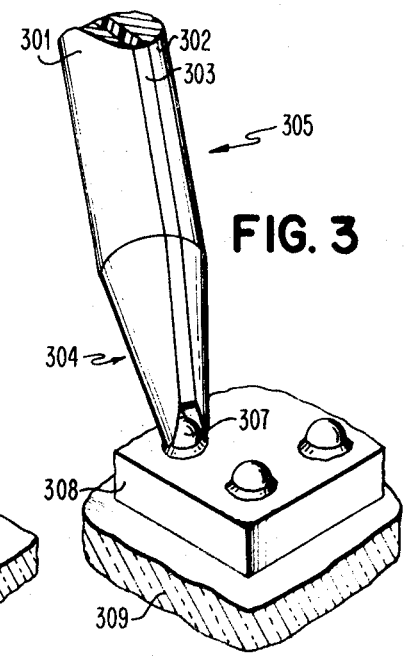
FIG. 3 shows another embodiment of the electrical contact device of this invention, contacting spherical protruding contacts upon a semiconductor device.

FIG. 3 shows another embodiment of the electrical contact device of this invention. Elongate electrically conductive members 301 and 302 are separated from each other by an insulating layer 303. This insulating layer may be any electrical insulator or dielectric material, or air. The members 301, 302, and insulator 303 are shown tapering off to a conical shape in region 304. Extending beyond termination of the insulator layer at 305, each member 301, 302 has a semitrough shape configuration. This semitrough shape configuration is similar to that of the electrical contact device as shown in FIG. 1 and 2. The semitrough shape is chosen of a geometrical configuration to allow self-alignment. In FIG. 3, the elongated electrical contact device 305 is shown contacting protruding electrical contact 307, such as a solder ball, making contact to an emitter, base, or collector of a semiconductor device 308. Semiconductor device 308 is held rigid on a support member 309. The embodiment of FIG. 3 is shown in FIG. 4 with the electrical contact device 305 contacting a protruding electrical contact on the semiconductor device 308 upon the mounting block 309. The electrical contact device 305 is held in a securing block 401 attached to an aligning member 402, which is part of a support assembly 403. Electrical contact leads run internally through aligning member 402 to the individual electrically conductive members 301, 302 that comprise electrical contact device 305. The support assembly 403 allows two degrees of freedom when released from the aligning bar, in the X and Y directions with Z plane movement the same as that previously described. Thus, when the alignment member 402 is lowered bringing electrical contact device 305 into contact with a protruding electrical contact, self-alignment will occur due to the particular shape of the semitrough shape on each electrically conductive member.

Figure 5:
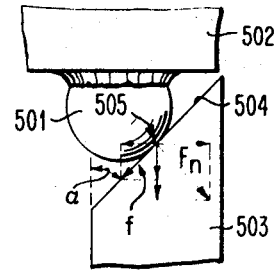
FIG. 5 illustrates the frictional effect and forces to be accounted for in the design of the semitrough shaped tips of each electrically conductive member of the electrical contact device.

FIG. 5 shows the design criteria for the semitrough shape of each electrically conductive member that comprises the electrical contact device. In FIG. 5, a spherical protruding electrical contact 501 is shown attached to a semiconductor device 502, which is rigidly secured to a mounting, not shown. In exaggerated scale, one of the electrically conductive members 503 that comprise the electrical contact device is shown. The semitrough shape is shown for convenience of calculation as a straight plane 504. Those skilled in the art will readily see that this shape need not be straight, but may be parabolic or of other curved configurations, to optimize for the design criteria that must be met.

In FIG. 5, $\alpha$ is the angle of the tangent to the point of contact to the vertical, at the contact point 505 between member 503 and contact 501. F is the friction force preventing the member 503 from sliding in relation to the spherical contact. $\mu$ is the coefficient of friction between the two surfaces, which is a function of the material, and the quality of finish on the surfaces. $F_n$ is the force developed as a result of the deflection of the alignment beam when it makes contact via member 503 with protruding contact 501. This alignment beam, for example, is member 204 in FIG. 2, or 402 in FIG. 4. Again, in FIG. 5, $$\Sigma F_x = F_n \cos \alpha - \mu F_n \sin \alpha$$

Assuming no force restricting the lateral motion of the beam, the beam will move to center itself or align itself on the spherical contact if:

$$F_n \cos \alpha > \mu F_n \sin \alpha$$

or $$1 > \frac{F_n \sin \alpha}{F_n \cos \alpha}$$

$$1 > \mu \tan \alpha$$

$$\mu \tan \alpha < 1$$

Thus, if $\mu \tan \alpha$ is less than 1, the beam will center or self-align. Convenience curves or plots can be made of $\mu \tan \alpha$ versus $\alpha$. In such a curve plot, for example, taking $\mu = 0.5$, it would cross the point where $\mu \tan \alpha = 1$ at slightly greater than tan 60°. Therefore, an $\alpha$ of 60° will at $\mu = 0.5$ be effective for self-centering. Other $\mu$ values can be plotted on the curve for convenience as materials are varied. To select the proper angle, the coefficient of friction for the materials involved must first be determined by known methods. If a restricting force exists in the lateral direction, a similar formula may be used to select the proper angle. In both cases, if the force is nonexistant or constant during the lateral motion, the ideal surface is a straight line; the contact opening is the straight sided V-trough of the calculated angle. If, however, the restricting lateral force is not constant but varies with the amount of motion, the formula would generate a curved surface for an ideal solution, such as a parabolic surface.

In sum, each semitrough shape of the electrical contact members must be chosen of a geometrical configuration to be slidable, and thus self-aligning, when the force applied when one of the bars at its semitrough shaped end contacts the protruding contact, is sufficient to overcome the retarding frictional effect of such contacts. It is clear that not any shape will do; and that for convenience, a spherical contact and a flat plane have been used for calculation. As not all contacts are spherical, these considerations must be accounted for using the known calculatable techniques as illustrated in the prior examples of FIG. 5.

While various alignment fixtures have been shown in FIGS. 2 and 4, one skilled in the art can readily devise other alignment units. The key feature of this invention is the self-aligning feature of the electrical contact device itself. Through this self-alignment feature, two electrical contact members may be joined on to a single alignment bar, provided that they are electrically isolated, and thus may be utilized to easily and nondestructively contact a protruding electrical contact for electrical test purposes. While these purposes are not exclusively limited to Kelvin probing techniques, Kelvin probing, being of such importance in the semiconductor field, it is a prime use for such an electrical contact device.

While the invention has been particularly shown and described with reference to preferred embodiments thereof, it will be understood by those skilled in the art that various changes in form and details may be made therein without departing from the spirit and scope of the invention.

What is claimed is:

1. A self-aligning Kelvin probe capable of contacting closely spaced contacts on a body to be probed, said probe comprising:
   first and second electrodes separated by an electrically insulating layer contiguous with said electrodes, each of said electrodes being electrically connectable to external electrical test means;
   means on each of said electrodes having complimentary inwardly beveled portions defining a recessed seat for releasable electrical contact on and about a protruding electrical terminal; and
   resilient suspension means supporting the Kelvin probe, said suspension means being movable with at least two degrees of freedom to allow self-aligning movement of the Kelvin probe for contacting the electrical contact on the body to be probed.

2. A self-aligning electrical contact device for Kelvin probing comprising:

a Kelvin probe, said probe comprising first and second electrically conductive contact members separated by an electrically insulating layer, each of said members being electrically connectable on one end to external electrical test means, each of said members on the other end being of a semitrough shape extending beyond said insulating layer so as to jointly form a trough shaped configuration for electrically contacting a protruding electrical contact on a body to be probed, said semitrough shape having a slidable self-aligning configuration for self-aligning upon the protruding electrical contact; and resilient suspension means supporting the Kelvin probe, said suspension means being movable with at least two degrees of freedom to allow self-aligning movement of the Kelvin probe for contacting the corresponding contact on the body to be probed.

3. A self-aligning Kelvin probe fixture comprising:

a plurality of Kelvin probes, each Kelvin probe comprising first and second electrically conductive contact members separated by an electrically insulating layer, each of said members being electrically connectable on one end to external electrical test means, each of said members on the other end being of a semitrough shape extending beyond said insulating layer so as to jointly form a trough shape configuration for electrically contacting a corresponding protruding electrical contact on a body to be probed, said semitrough shape having a slidable self-aligning configuration for self-aligning upon the protruding electrical contact; and resilient suspension means supporting the Kelvin probes, said suspension means providing independent self-aligning movement of each Kelvin probe with at least two degrees of freedom for contacting the corresponding electrical contact on the body to be probed.